(12) United States Patent
Pfotenhauer et al.

(10) Patent No.: US 6,453,964 B1
(45) Date of Patent: Sep. 24, 2002

(54) APPARATUS FOR APPLYING STRIPS OF THERMOPLASTIC MATERIAL TO THERMOPLASTIC ROOFING MEMBRANES

(75) Inventors: Claus Pfotenhauer, Alpnach-Dorf (CH); Brian Whelan, Canton, MA (US)

(73) Assignee: Sarnafil International AG, Sarnen (CH)

( * ) Notice: Subject to any disclaimer, the term of this patent is extended or adjusted under 35 U.S.C. 154(b) by 71 days.

(21) Appl. No.: 09/739,190

(22) Filed: Dec. 18, 2000

(51) Int. Cl.[7] ............................................. B32B 31/00
(52) U.S. Cl. .................... 156/391; 156/497; 156/499; 156/574
(58) Field of Search .................. 156/391, 497, 156/499, 544, 545, 552, 554, 574, 577, 579

(56) References Cited

U.S. PATENT DOCUMENTS

| | | | |
|---|---|---|---|
| 2,373,737 A | 4/1945 | Phillips, Jrr. ................. 154/42 |
| 3,658,628 A * | 4/1972 | Zenter ......................... 156/527 |
| 3,962,016 A | 6/1976 | Alfter et al. ................. 156/304 |
| 4,204,904 A * | 5/1980 | Tabor .......................... 156/497 |
| 4,714,509 A * | 12/1987 | Gruber ...................... 156/272.2 |
| 4,761,201 A * | 8/1988 | Nichols, Jr. ................. 156/497 |
| 4,855,004 A * | 8/1989 | Chitjian ...................... 156/359 |
| 4,913,772 A | 4/1990 | Taylor et al. ............... 156/499 |
| 5,045,146 A | 9/1991 | Rundo ......................... 156/391 |
| 5,213,278 A * | 5/1993 | Holbek et al. ................. 242/94 |

* cited by examiner

*Primary Examiner*—James Sells

(57) ABSTRACT

An apparatus for applying strips of thermoplastic material to thermoplastic roofing membranes, the strips each having an upstanding central portion extending lengthwise thereof and opposed flange portions extending widthwise from the central portion. The apparatus includes a self-propelled housing having drive wheels thereon for movably supporting the housing on the membranes. A guide member is mounted on the housing for disposal over one of the strips and is adapted to receive the strip central portion and guide the strip into a position beneath the housing as the housing moves over the strip. A pressure wheel is mounted on the housing rearwardly of the guide member, the pressure wheel having a peripheral groove adapted to receive the strip central portion, and two peripheral edges adapted to engage the opposed flange portions of the strip.

16 Claims, 10 Drawing Sheets

APPARATUS FOR APPLYING STRIPS OF THERMOPLASTIC MATERIAL TO THERMOPLASTIC ROOFING MEMBRANES

BACKGROUND OF THE INVENTION

1. Field of the Invention

The invention relates to apparatus for cladding roofs of buildings with thermoplastic membranes, and is directed more particularly to an apparatus for applying upstanding thermoplastic strips of a selected configuration to upper surfaces of the membranes.

2. Description of the Prior Art

It is known to apply thermoplastic membranes to roof tops to prevent leakage of water through the roof. Typically, the membranes are sealed to each other along overlapping edges. It is also known to apply metal sheets to roof tops. The metal sheets typically are configured with spaced stiffening ribs and with interlocking edges to join the metal sheets together. The interlocking edges of the ribs may then be covered with a channel member.

The appearance of the metal clad roof is generally regarded as quite attractive, in part because of the aesthetic qualities of the roof, and perhaps in part because of the perception that metal roofs are relatively expensive and therefore "attractive". For whatever reason, the appearance of metal roofs is generally acclaimed.

In view of the widespread appreciation of the appearance of the metal clad roofs, there have been attempts to duplicate the appearance thereof in thermoplastic clad roofs. The distinctive characteristic of the metal clad roof is the presence of the upstanding channel members, or junctures, of the metal sheets. To duplicate this appearance, thermoplastic strips have been secured to the thermoplastic membranes, sometimes by adhesive, and sometimes by the application of heat, all of which is done manually. Unfortunately, application of the strips manually is a time consuming and labor intensive process, increasing substantially the cost of the roofing and decreasing the cost advantage gained by selecting thermoplastic roofing over metal roofing. Further, manual application also increases opportunity for error and is not conducive to creating straight and/or parallel and/or equidistant lines.

Accordingly, there is a need for a means for quick and inexpensive application of thermoplastic strips to thermoplastic roofing membranes.

SUMMARY OF THE INVENTION

An object of the invention is, therefore, to provide an apparatus for applying strips of thermoplastic material to thermoplastic roofing membranes.

With the above and other objects in view, as will hereinafter appear, a feature of the present invention is the provision of an apparatus for applying strips of thermoplastic material to thermoplastic roofing membranes, the strips each having an upstanding central portion extending lengthwise thereof and opposed flange portions extending widthwise from the central portion. The apparatus comprises a self-propelled housing having drive wheels thereon for movably supporting the housing on the membranes. A guide member is mounted on the housing for disposal over one of the strips and is adapted to receive the strip central portion and guide the strip into a position beneath the housing as the housing moves over the strip to help create a straight line. A pressure wheel is mounted on the housing rearwardly of the guide member. The pressure wheel is provided with a peripheral groove adapted to receive the strip central portion, and two peripheral edges adapted to engage the opposed flange portions of the strip.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
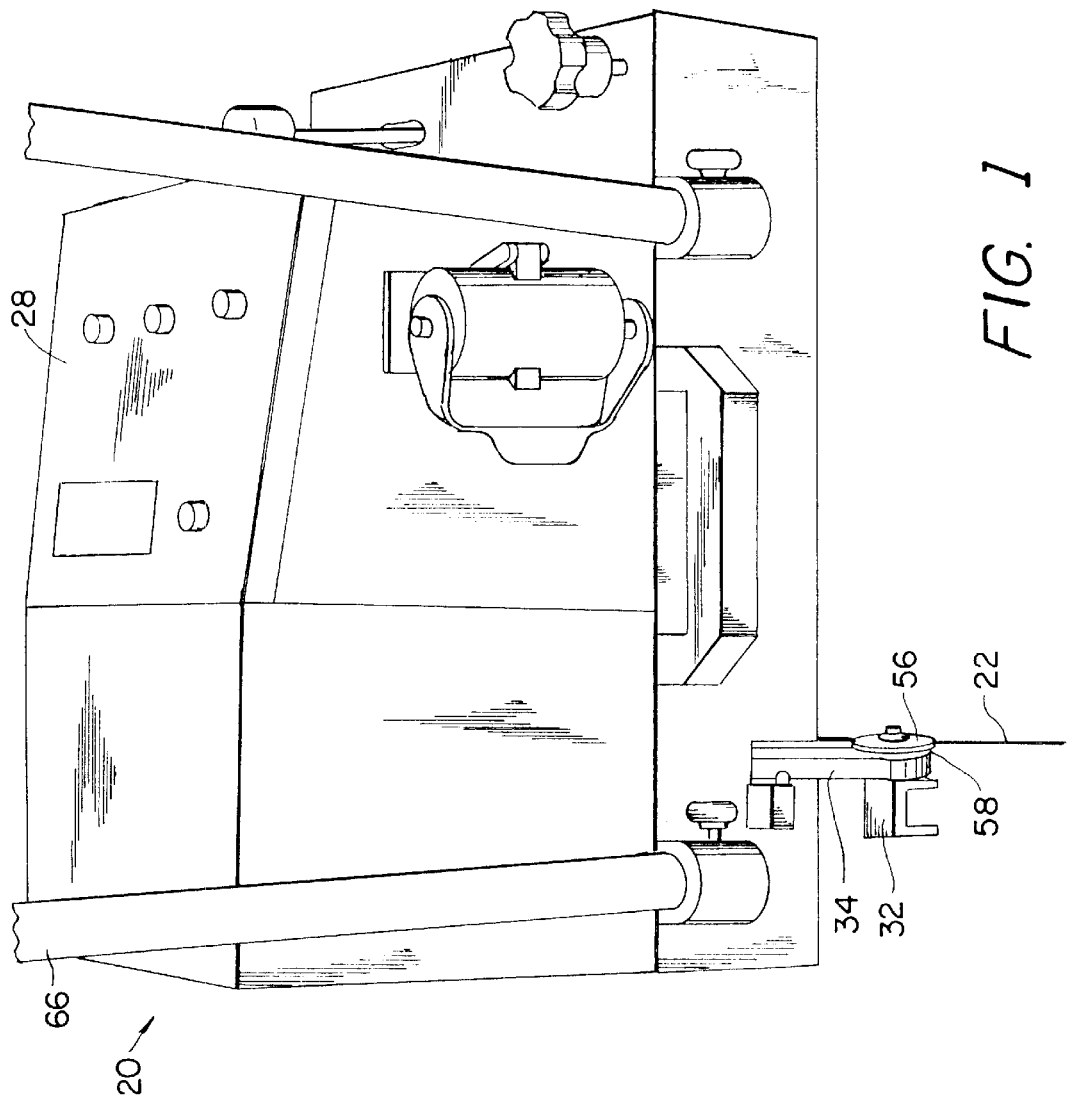
FIG. 1 is a perspective, generally front view of one form of apparatus, illustrative of an embodiment of the invention.

Referring to FIGS. 1–8, it will be seen that an illustrative embodiment of the apparatus 20 for applying strips 24 of thermoplastic material and of a selected configuration to a thermoplastic membrane 26 includes a self-propelled housing 28 having drive wheels 30 thereon (FIGS. 7 and 8) for movably supporting the housing 28 on the membrane 26.

A guide member 32 (FIGS. 1 and 2) is mounted on the housing 28, as by a bracket 34. The guide member 32 is a rigid member of an inverted-U configuration.

Figure 2:
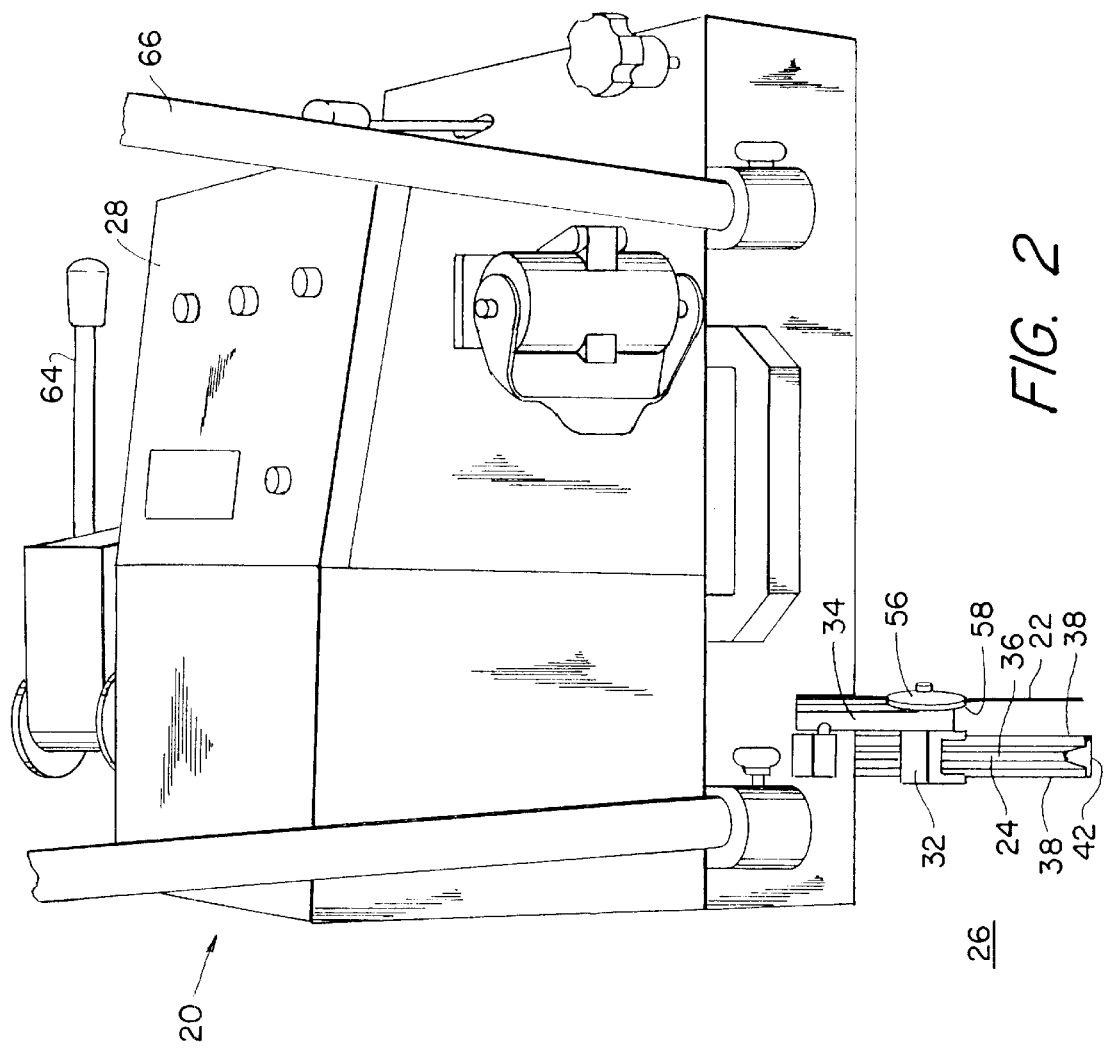
FIG. 2 is similar to FIG. 1, but showing the apparatus in use.
Figure 9:
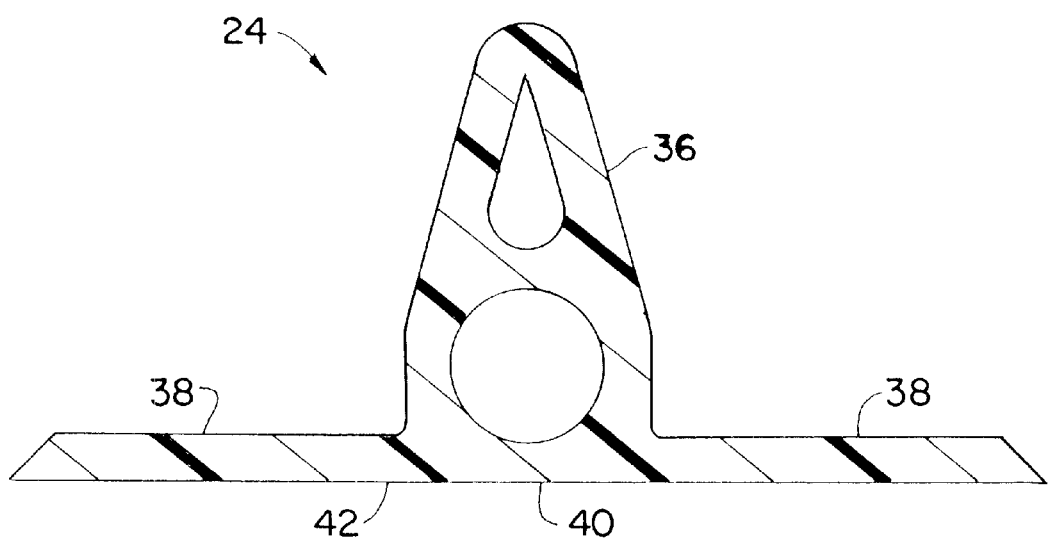
FIG. 9 is an enlarged cross-sectional view of a strip of the type shown in FIGS. 2, and 4–8.

The thermoplastic strip 24 preferably includes an upstanding central portion 36 extending lengthwise along the strip, and opposed flange portions 38 extending widthwise from the central portion 36, as is shown in FIG. 9. The opposed flange portions 38, in conjunction with a bottom portion 40 of the strip central portion 36, form an integral bottom surface 42 of the strip. The guide member 32 is adapted to be disposed over one of the strips 24 and to receive the strip central portion 36 therein (FIG. 2).

A pressure wheel 44 is mounted on the housing 28 rearwardly of the guide member 32. The pressure wheel 44 is provided with a peripheral groove 46 for receiving the strip central portion 36, and two peripheral edges 48 for engaging the opposed flange portions 38 of the strip 24.

Figure 3:
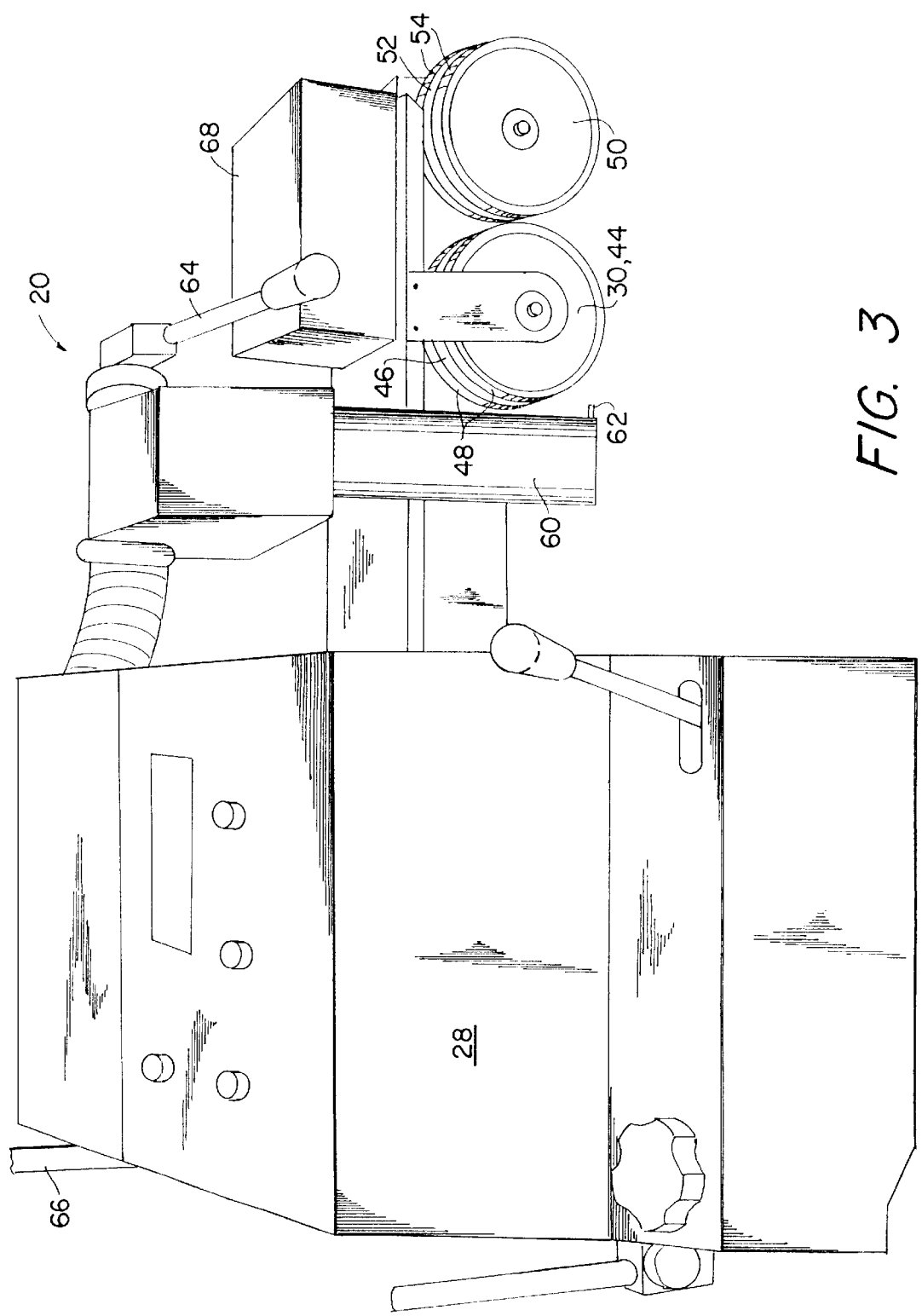
FIG. 3 is a perspective, generally side view of the apparatus of FIG. 1.
Figure 4:
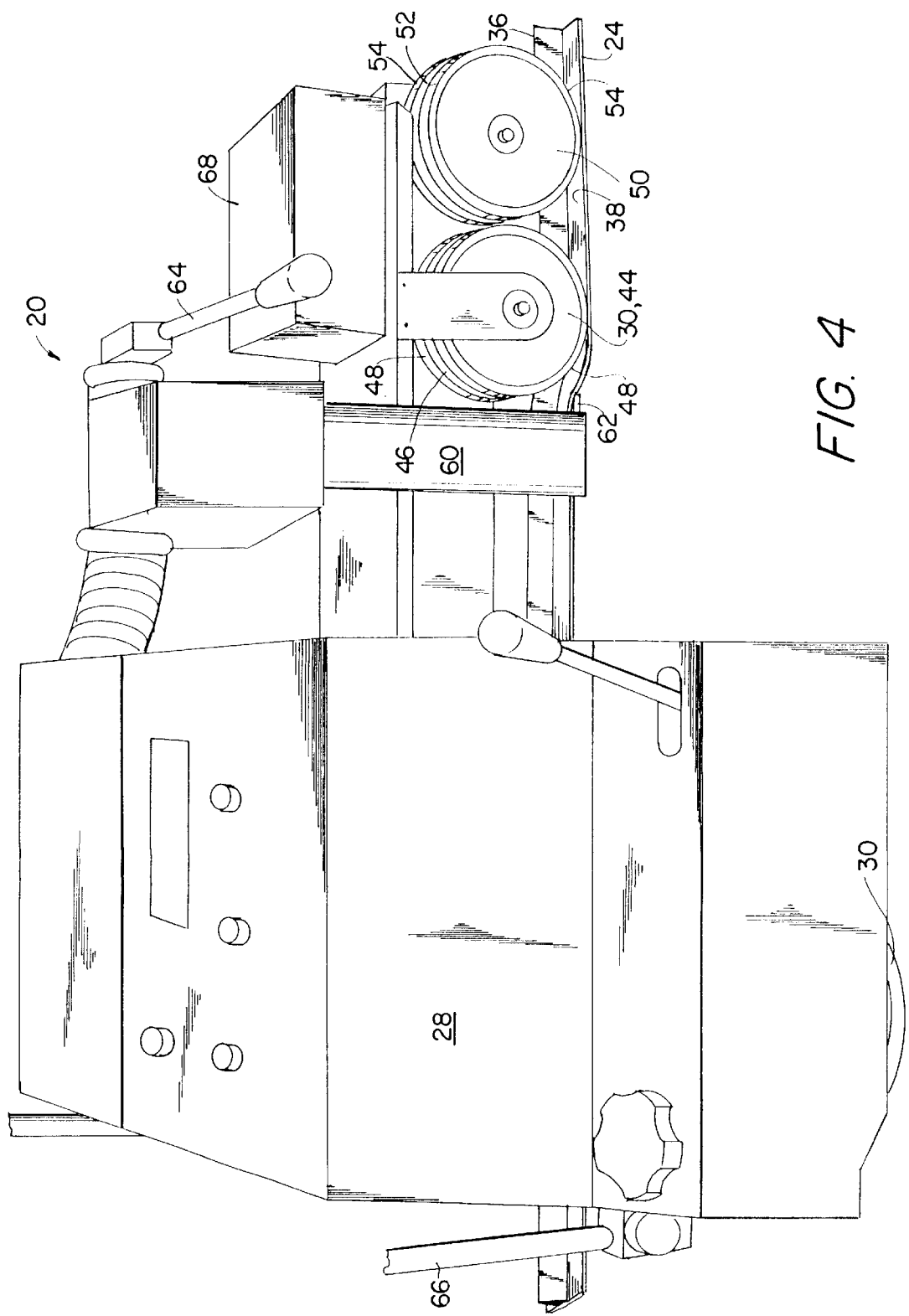
FIG. 4 is similar to FIG. 3, but showing the apparatus in use.
Figure 5:
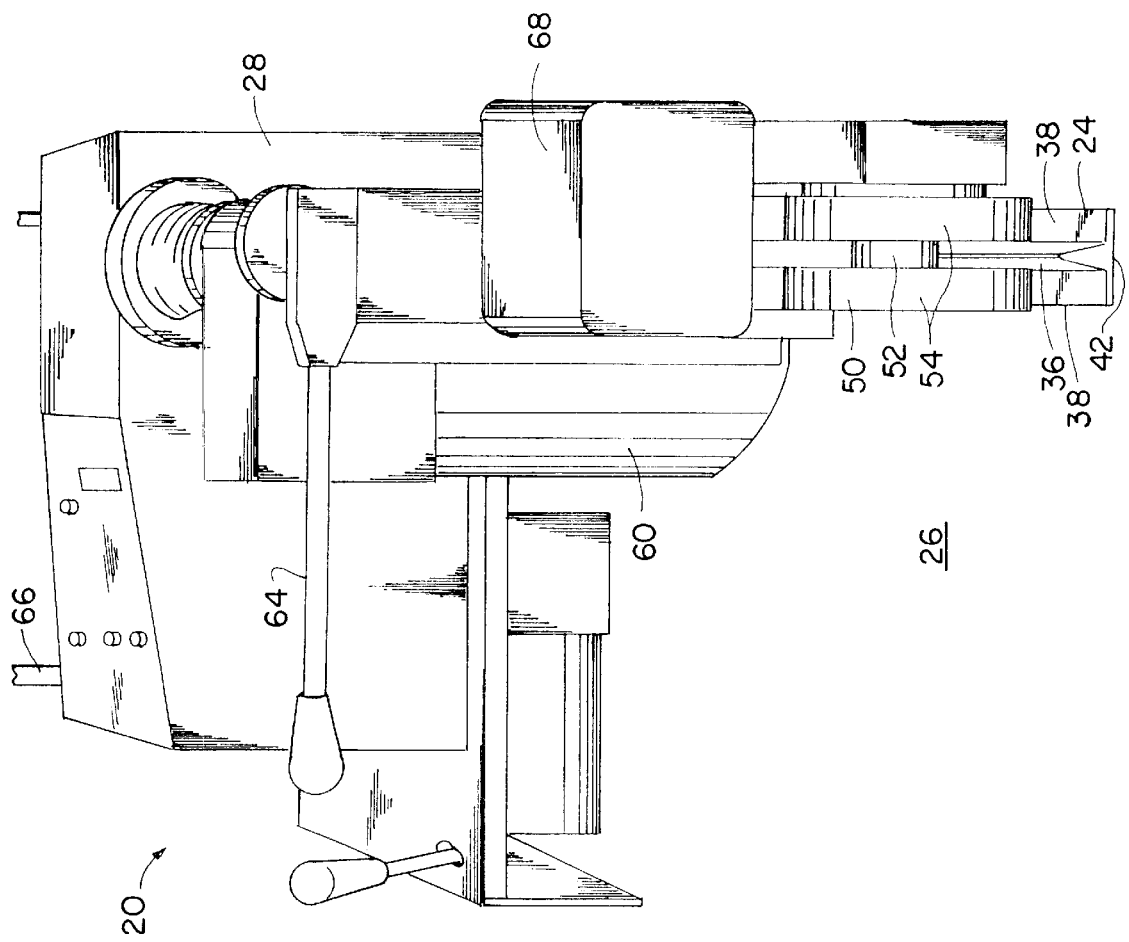
FIG. 5 is a perspective, generally rear view of the apparatus in use.
Figure 6:
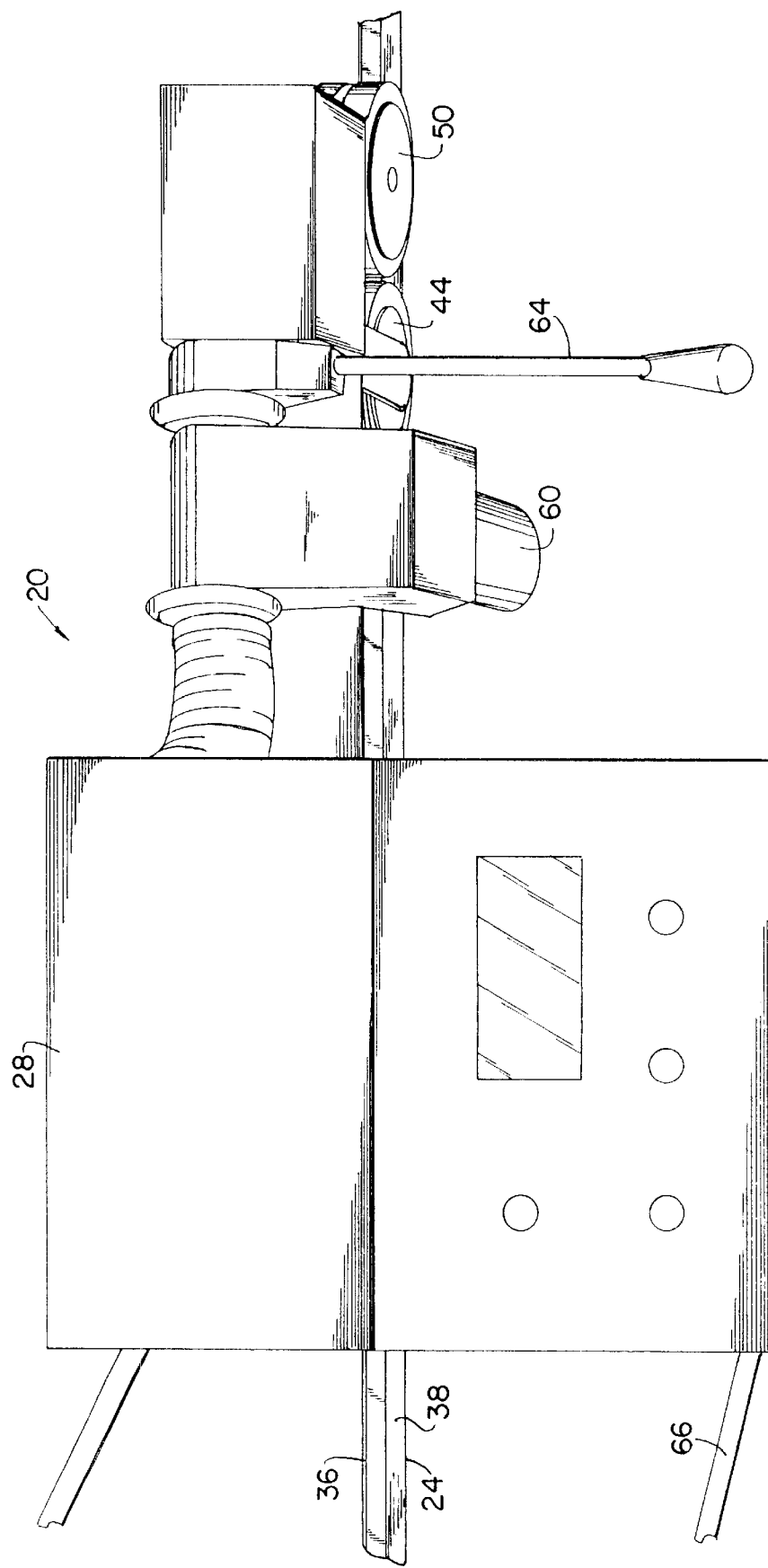
FIG. 6 is a perspective, generally top view of the apparatus in use.
Figure 7:
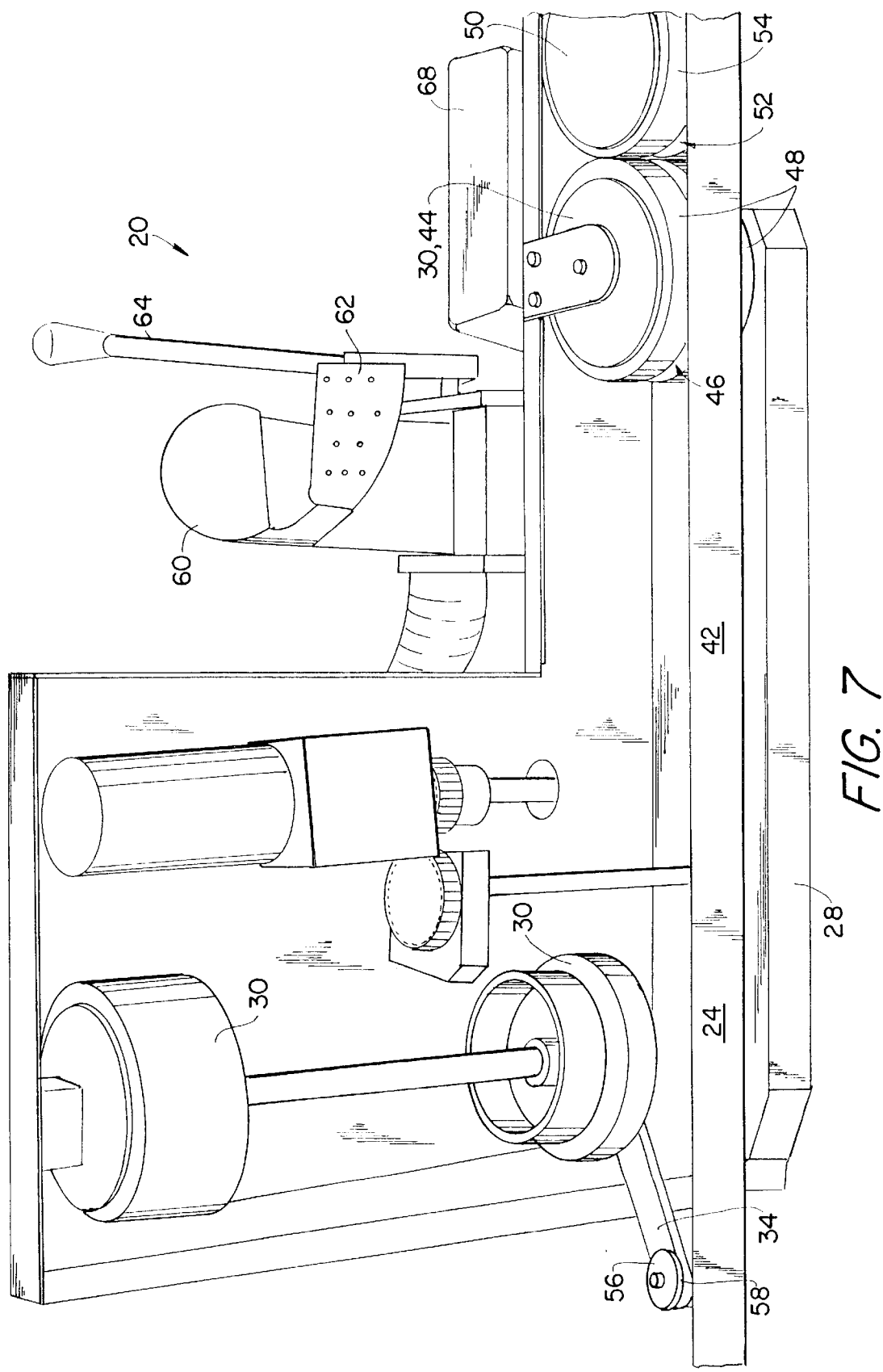
FIG. 7 is a perspective, generally bottom view of the apparatus in place for use, but with a heating nozzle in an inoperative position.
Figure 8:
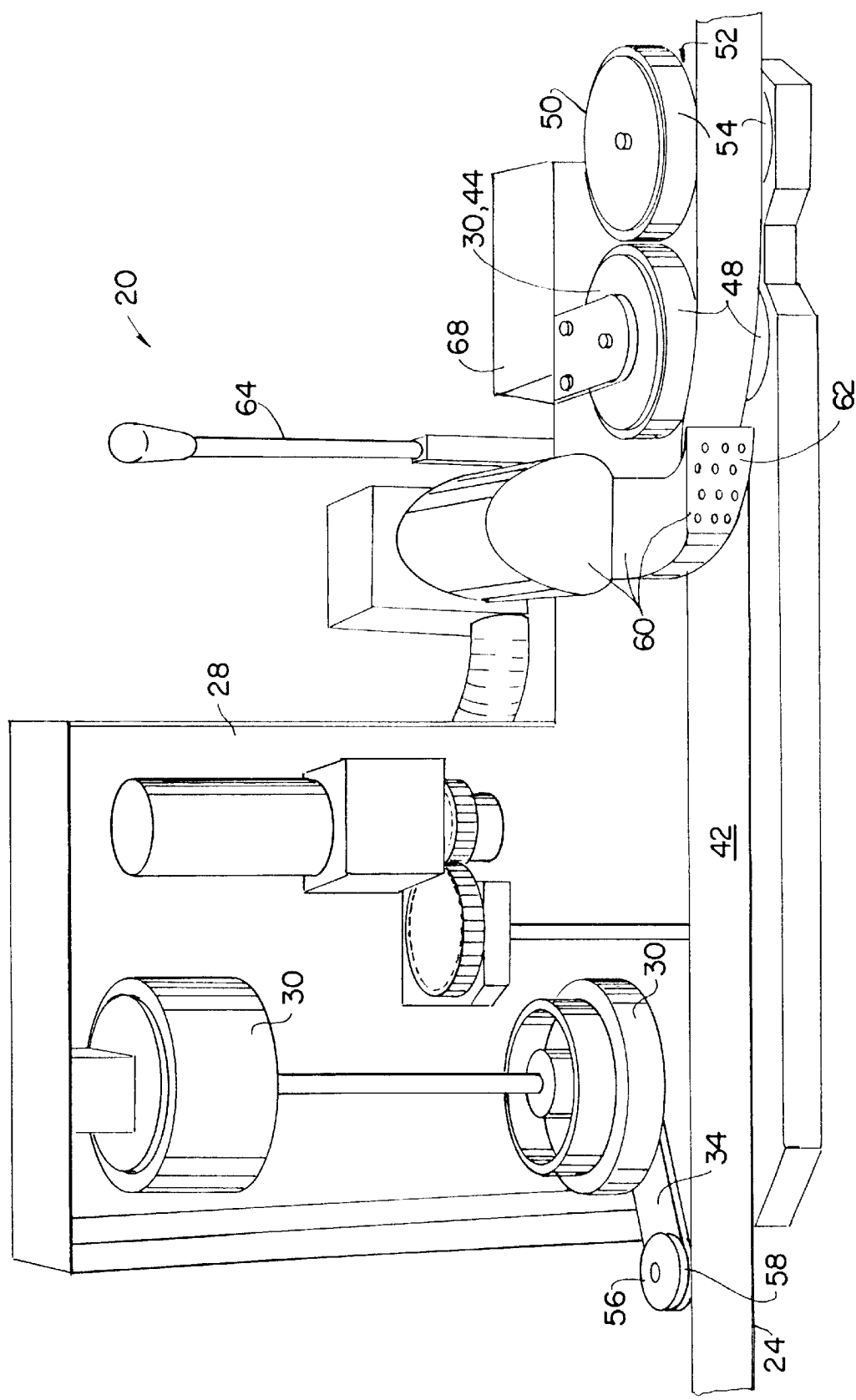
FIG. 8 is similar to FIG. 7 but showing the apparatus with the heating nozzle in an operational position.

Preferably, the pressure wheel 44 is driven and therefore also constitutes an additional drive wheel 30. It is further preferable that there be provided on the housing 28 a second pressure wheel 50. Similarly to the pressure wheel 44, the second pressure wheel 50 is provided with a peripheral groove 52 adapted to receive the strip central portion 36, and two peripheral edges 54 adapted to engage the opposed flange portions 38 of the strip 24 (FIG. 5). The pressure wheels 44, 50 are disposed edge-to-edge and in alignment with each other, as shown in FIGS. 3 and 5.

The apparatus is further provided with a tracking member 56 which is mounted on the housing 28 for visual positioning of the guide member 32 relative to a selected and marked path 22 (FIGS. 1 and 2) on the roofing membrane 26. The tracking member 56 is mounted proximate the guide member 32, preferably, but not necessarily, on the same bracket 34 (FIGS. 1, 2, 7 and 8). As shown, the tracking member 56 may be in the form of a rotatably mounted disc having a peripheral edge 58 engageable with the roofing membrane 26.

The apparatus described hereinabove may be used to apply pressure sensitive strips to the roofing membranes. For the application of strips to the membrane by thermal welding, the apparatus 20 is further provided with a nozzle 60 (FIGS. 3–8) which is mounted on the housing 28 and is adapted to blow heated air between the strip 24 and the roof membrane 26 before the strip is engaged by the pressure wheels 44, 50.

The nozzle 60 is pivotally mounted on the housing 28 and is provided with a thin substantially planar blade-like outlet end portion 62 (FIGS. 7 and 8) movable, as by a lever 64, between a position (FIG. 7) removed from the strip 24 to a position (FIG. 8) in which the blade-like outlet end portion 62 is disposed between the strip bottom surface 42 and the roofing membrane 26 therebeneath, to heat the strip bottom surface 42 and the underlying membrane 26 simultaneously.

In operation, lines 22 are marked on the roofing membranes 26 to delineate the selected locations for the strips 24. The spacing of the strips, and therefore the lines, is a matter of selection. A strip 24 is then manually placed generally alongside the marked line 22. The apparatus 20 and strip 24 are placed such that the tracking disc 56 is on the line 22 and the guide member 32 strides the strip central portion 36. By movement of the lever 64, the operator pivots the nozzle 60 from the position shown in FIG. 7 to the position shown in FIG. 8, to place the nozzle outlet portion 62 between the strip 24 and the membrane 26.

The apparatus 20, which is electrically driven, and in which air is electrically heated, is then started and guided by an operator (not shown) manipulating a handle 66 to pull the tracking disc 56 along the previously marked line 22 on the membrane 26 as the apparatus 20 moves along. The guide member 32 ingests the strip 24 and places the strip in proper position for attachment to the membrane alongside the marked line.

Figure 10:
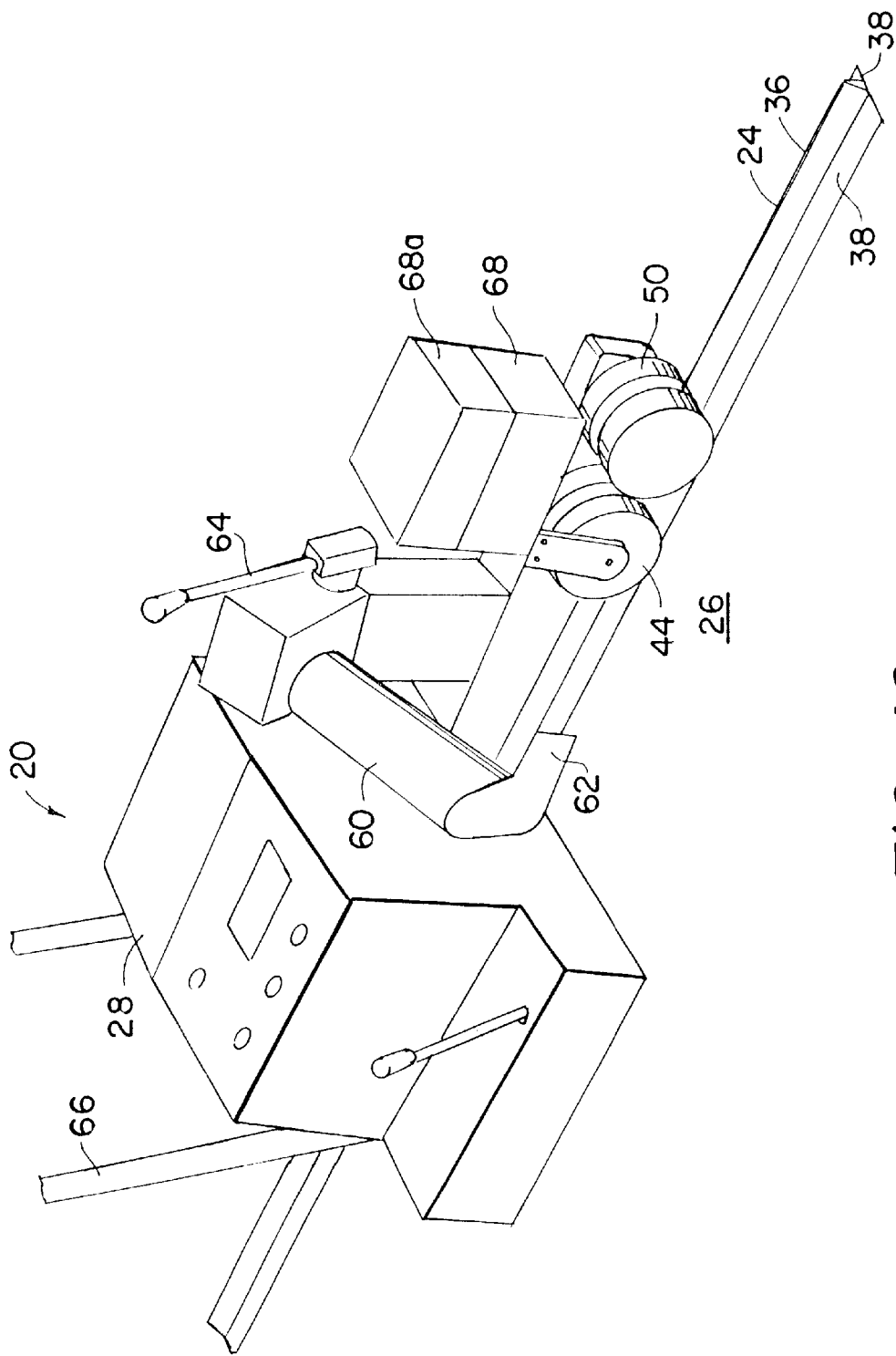
FIG. 10 is a perspective view of the apparatus of FIGS. 1–8 in position for use in attaching the strip of FIG. 9 to a roof top membrane.

After entering the apparatus 20, the strip bottom surface 42 and the underlying membrane 26 are simultaneously heated by air discharged from the nozzle 60. Thereafter, the pressure wheels 44, 50 roll over the just-heated strip and press the strip flange portions 38 into firm engagement with the just-heated membrane surface. To ensure firm engagement, the apparatus 20 has mounted thereon a weight member 68 and, if desired, one or more additional weight members 68a (FIG. 10), the weight members being mounted over the pressure wheels 44, 50, to ensure fusing of the strip to the membrane.

After the apparatus has been guided over the length of the strip, the apparatus is moved to the next strip, and so on.

There is thus provided an apparatus for quickly and easily fusing thermoplastic strips onto thermoplastic roofing membranes. In addition to improving the appearance of the thermoplastic membrane clad roof, the strips combine the aesthetic improvement with the recognized water proofing superiority of membrane roofs. Still further, in instances in which it is desirable to channel the flow of rain water or snow into a particular gutter or other receptacle, the strips can be applied for reasons of flow control in addition to, or instead of, enhancing appearance.

It is to be understood that the present invention is by no means limited to the particular construction herein disclosed and/or shown in the drawings, but also comprises any modification or equivalent within the scope of the claims.

What is claimed is:

1. Apparatus for applying strips of thermoplastic material to thermoplastic roofing membranes, the strips each having an upstanding central portion extending lengthwise thereof and opposed flange portions extending widthwise from the central portion, the apparatus comprising:

a self-propelled housing having drive wheels thereon for movably supporting the housing on the membranes;

a guide member mounted on said housing for positioning over one of the strips and adapted to receive the strip central portion and guide the strip into a position beneath said housing as said housing moves over the strip; and a pressure wheel mounted on said housing rearwardly of said guide member, said pressure wheel having a peripheral groove adapted to receive the strip central portion, and two peripheral edges adapted to engage the opposed flange portions of the strip.

2. The apparatus in accordance with claim 1 wherein said apparatus further comprises a nozzle mounted on said housing for blowing heated air between the strip and the roof membrane before engagement of said pressure wheel with the strip.

3. The apparatus in accordance with claim 1 wherein said guide member comprises a rigid member of an inverted-U configuration.

4. The apparatus in accordance with claim 1 wherein said pressure wheel comprises an additional driving wheel.

5. The apparatus in accordance with claim 4 wherein said apparatus comprises a second pressure wheel, said second pressure wheel having a peripheral groove adapted to receive the strip central portion, and two peripheral edges adapted to engage the opposed flange portions of the strip.

6. The apparatus in accordance with claim 5 wherein said pressure wheels are in alignment with each other and disposed edge-to-edge.

7. The apparatus in accordance with claim 1 and further comprising a tracking member mounted on said housing for visual positioning of said guide member relative to a selected and marked path on the roofing membrane.

8. The apparatus in accordance with claim 7 wherein said tracking member is mounted proximate said guide member.

9. The apparatus in accordance with claim 7 wherein said tracking member comprises a rotatably mounted disc having a peripheral edge engageable with the roofing membrane.

10. The apparatus in accordance with claim 2 wherein said nozzle is mounted on said housing rearwardly of said guide member and forwardly of said pressure wheel.

11. The apparatus in accordance with claim 1 wherein the strip opposed flange portions, in conjunction with a bottom portion of said central portion, form an integral bottom surface of the strip and the strip bottom surface is pressed against the roofing membranes by said pressure wheel.

12. The apparatus in accordance with claim 11 wherein said apparatus further comprises a nozzle mounted on said housing for blowing heated air between the strip bottom surface and the roofing membrane.

13. The apparatus in accordance with claim 12 wherein said nozzle is provided with a blade-like outlet end portion which is movable to a position between the strip bottom surface and the roofing membrane to direct the heated air therebetween.

14. The apparatus in accordance with claim 13 wherein said nozzle is pivotally mounted on said apparatus for movement between a position removed from the strip to a position wherein the blade-like outlet end portion is disposed between the strip bottom surface and the roofing membrane.

15. The apparatus in accordance with claim 2 wherein said nozzle is provided with a blade-like outlet end portion which is movable to a position between the strip and the roofing membrane to direct the heated air therebetween.

16. The apparatus in accordance with claim 15 wherein said nozzle is pivotally mounted on said apparatus for movement between a position removed from the strip to a position wherein the blade-like outlet end portion is disposed between the strip and the roofing membrane.

* * * * *